Sept. 30, 1969   A. H. BICKEL ET AL   3,469,926
TESTING DEVICE FOR MISSILE GUIDANCE SECTION
Filed Nov. 15, 1965
3 Sheets-Sheet 1
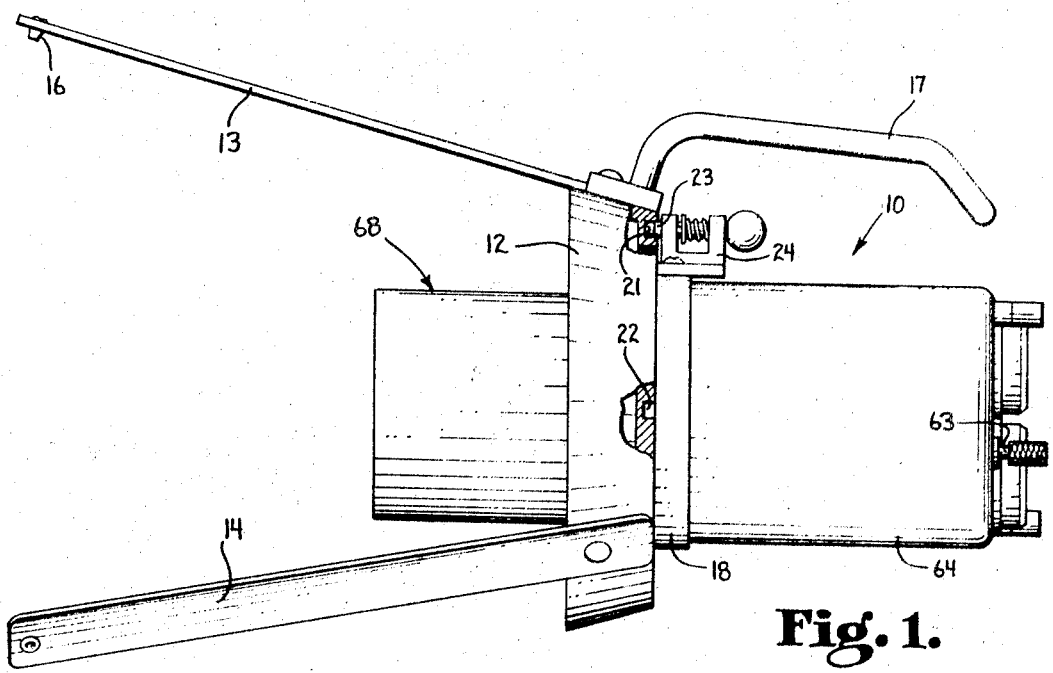
Fig. 1.
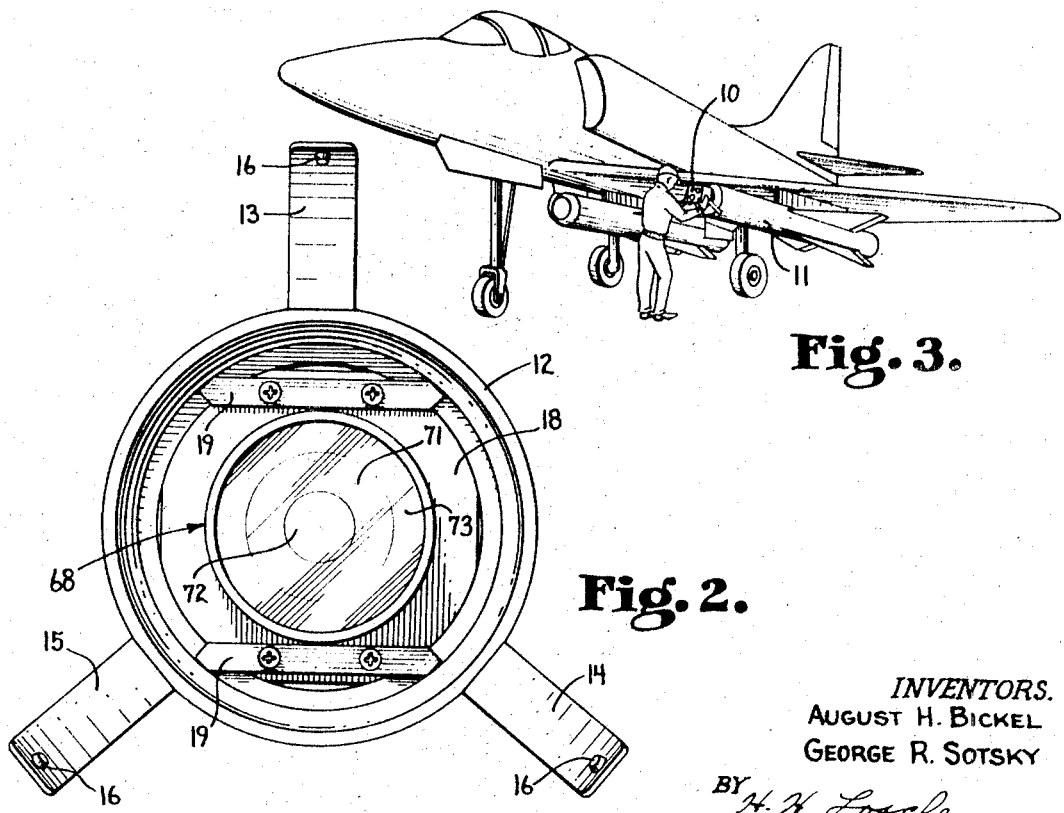
Fig. 3.
Fig. 2.
INVENTORS.
AUGUST H. BICKEL
GEORGE R. SOTSKY
BY H. H. Loscle
Paul S. Collignon
ATTYS.

Sept. 30, 1969    A. H. BICKEL ET AL    3,469,926
TESTING DEVICE FOR MISSILE GUIDANCE SECTION
Filed Nov. 15, 1965                     3 Sheets-Sheet 2
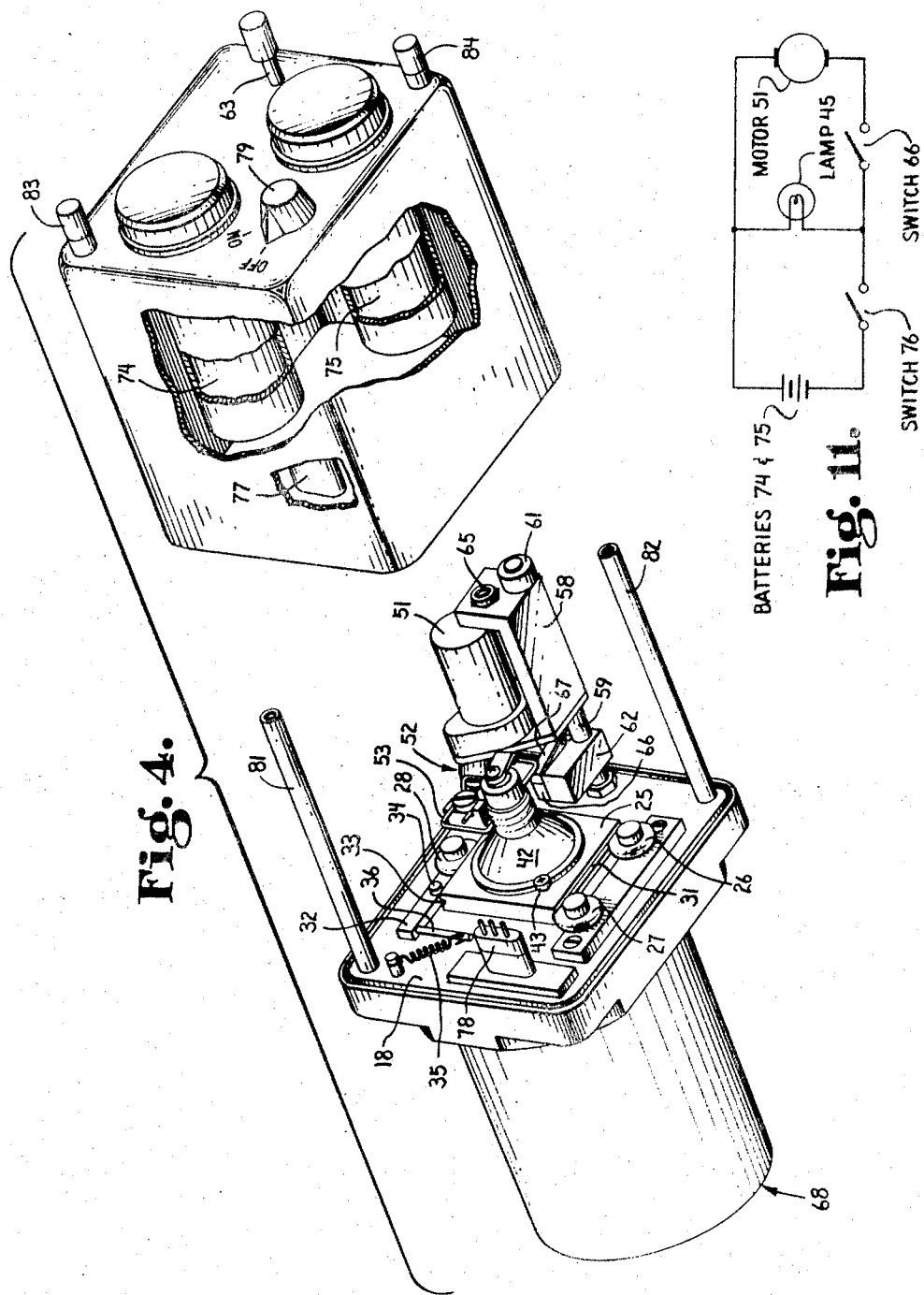
INVENTORS.
AUGUST H. BICKEL
GEORGE R. SOTSKY
BY
*N. H. Loscke*
*Paul S. Collignon* ATTYS.

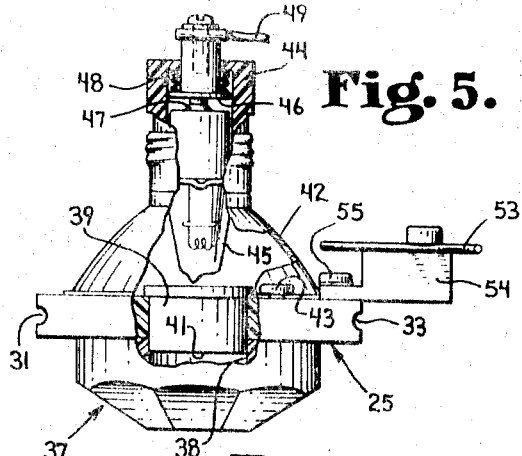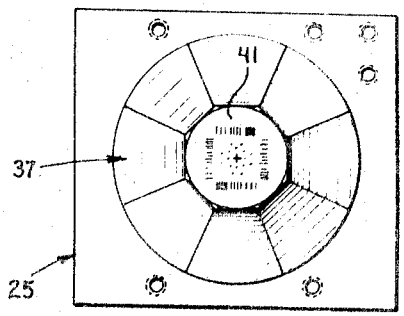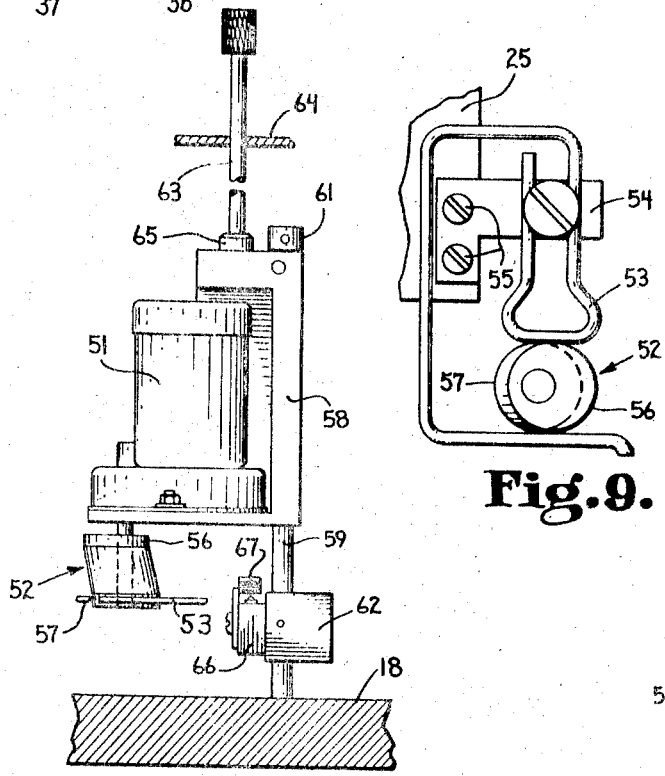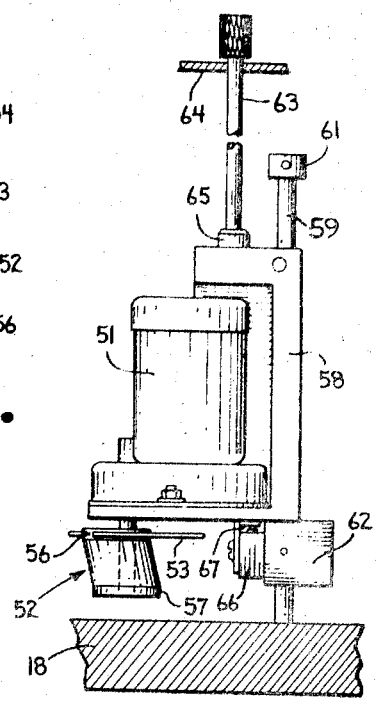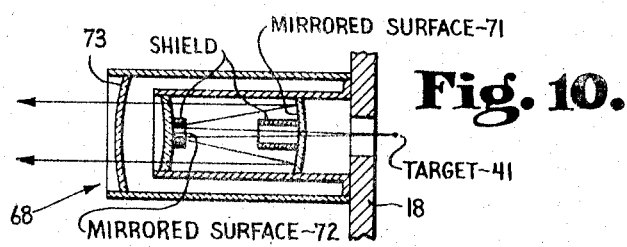

United States Patent Office 3,469,926
Patented Sept. 30, 1969

3,469,926
TESTING DEVICE FOR MISSILE GUIDANCE SECTION
August H. Bickel and George R. Sotsky, Louisville, Ky., assignors to the United States of America as represented by the Secretary of the Navy
Filed Nov. 15, 1965, Ser. No. 507,973
Int. Cl. G02b 27/32
U.S. Cl. 356—247                                2 Claims

ABSTRACT OF THE DISCLOSURE

A test set for checking the guidance section of a missile having an opaque target attached to a reflector plate which is reciprocally movable in first and second mutually perpendicular directions. A motor and cam mechanism are utilized for moving the reflector plate and the cam mechanism has means for centering the reflector plate relative to the guidance section when the reflector plate is stationary.

---

The invention described herein may be manufactured and used by or for the Government of the United States of America for governmental purposes without the payment of any royalties thereon or therefor.

The present invention relates to a device for testing the guidance section of a missile and more particularly to a test set for projecting an optical target into the guidance section of a missile to be launched from an aircraft.

In one type of air to surface missile, a television camera is provided in the guidance section to assist in directing the missile to a target, and also a television display is provided in the aircraft that is to carry and launch the missile. It is desirable to determine the operational readiness of both the guidance section in the missile and the television display after the missile has been loaded on the aircraft, and the present invention provides a "Go, No-Go" evaluation.

The present invention utilizes a mounting adapter to attach a test set assembly to a guidance section being checked. This mounting adapter utilizes a plurality of detents in the skin of the guidance section for mounting and by the use of a positioning knob located on a mounting ring, the test set may be shifted to either a vertical or horizontal position. An opaque target is provided in a highly polished reflector which reflects light from a source onto the front face of the target. The diverging light rays from the target are collimated by a lens system so that the rays are parallel and the target appears to be at infinity. A motor and cam assembly are provided to give linear reciprocal motion to the target. The test set can be operated either from self-contained batteries or can be connected to an external power source.

It is therefore a general object of the present invention to provide a testing device for determining operational readiness of a missile guidance section.

Other objects and advantages of the present invention will be readily appreciated as the same becomes better understood by reference to the following detailed description when considered in connection with the accompanying drawings wherein:

FIGURE 1 is a side view showing a preferred embodiment of the present invention;
FIGURE 2 is an end view of the embodiment shown in FIGURE 1;
FIGURE 3 is a diagrammatic view showing a preferred embodiment of the present invention being mounted on a missile that is suspended on an aircraft;
FIGURE 4 is a diagrammatic view showing a reflector and cover assembly of a preferred embodiment of the present invention;
FIGURE 5 is a bottom view, partially broken away, showing an illuminating assembly;
FIGURE 6 is a front view showing a reflector plate and a target;
FIGURE 7 is a side view showing a motor and cam assembly in a first position;
FIGURE 8 is a side view similar to FIGURE 7 of the drawings only showing a motor and cam assembly in a second position;
FIGURE 9 is a top view, partially broken away, showing a cam and cam follower arrangement;
FIGURE 10 is a diagrammatic view of a lens system; and
FIGURE 11 is a circuit diagram of the embodiment shown in FIGURE 4 of the drawings.

Referring now to the drawings, there is shown a test set 10 for testing the guidance section of a missile 11 that is shown, in FIGURE 3 of the drawings, to be suspended beneath the wing of an aircraft. A mounting plate 12 is provided, and three legs 13, 14, and 15 are attached to mounting plate 12. Each leg is provided with a protuberance 16 that is engageable with a detent in the skin of missile 11 to attach the test set 10 to the missile 11. A handle 17 is attached to mounting plate 12 to facilitate handling and carrying of the test set.

A base plate 18 is rotatably mounted to mounting plate 12. As shown in FIGURE 2 of the drawings, base plate 18 and mounting plate 12 are held together by straps 19 that are attached to the bottom on base plate 18 and slidably engaged with mounting plate 12. The test set 10 is provided with a target, which will be more fully described hereinafter and, in operation, base plate 18 is rotated to position the target in either a horizontal or vertical position. In order to insure proper positioning of the target in either the horizontal or vertical position, mounting plate 12 is provided with a pair of slots 21 and 22 that are displaced from one another by ninety degrees. A spring loaded plunger 23 is slidably attached in a bracket 24 that is attached to base plate 18, and plunger 23 is selectively engageable with slots 21 and 22 in mounting plate 12.

Referring now to FIGURES 4, 5, and 6 of the drawings, a reflector plate 25 is slidably attached to base plate 18 by means of wheels 26, 27, and 28 that engage with grooves on the side of reflector plate 25. Wheels 26 and 27, which engage with groove 31 in reflector plate 25 are free to rotate, but are stationarily positioned on base plate 18. Wheel 28, on the otherhand, is free to rotate but is mounted on bar 32 that is pivotally attached to base plate 18, and wheel 28 engages with groove 33 in reflector plate 25. Bar 32 pivots about pin 34 and a spring 35 is provided to bias wheel 28 into groove 33. Spring 35 has one end attached to shaft 36 which is connected to bar 32 and the other end of spring 35 is secured to base plate 18. It can be seen that the force of spring 35 causes wheel 28 to be biased in groove 33 and also groove 31 will be biased against wheels 26 and 27. Thus reflector plate 25 can be translated with a reciprocating motion.

As best shown in FIGURES 5 and 6 of the drawings, reflector plate 25 has a plurality of facets 37 on the front portion thereon and these facets 37 have a silver coating on the outside thereof and an opaque protective coating is provided over the silver coating, thus each facet 37 functions as a mirrored or reflective surface. Reflector plate 25 is provided with a through bore 38 and an opaque plug 39 is press-fitted therein. A target 41, which by way of example might be a pattern printed on paper, is attached, as by cementing, to the front of plug 39. A parabolic reflector 42 is attached to the backside of reflector plate 25 by means of screws 43. A lamp bulb holder 44, which is made of nonconducting material, such as nylon, is threadedly attached to parabolic reflector 42 and a lamp bulb 45 is positioned within lamp bulb holder 44. A contact 46 is biased against a lamp bulb contact 47 by spring 48 and a wire 49 is connected to contact 46 to conduct current thereto. When lamp bulb 45 is lit, light from lamp bulb 45 is reflected from facets 37 onto the face of target 41 to front light target 41.

Motion of reflector plate 25 is provided by motor 51 which rotates cam 52. As best shown in FIGURES 5 and 9 of the drawings, a spring follower 53 is attached to bracket 54 which, in turn, is attached by screws 55 to reflector plate 25. Spring follower 53 engages cam 52. Cam 52 is provided with an eccentric portion 56 and a concentric portion 57 and, when spring follower 53 is in engagement with the eccentric portion 56, rotation of cam 52 causes spring follower 53 to oscillate which, in turn, causes reflector plate 25 to oscillate. As best shown in FIGURES 7 and 8 of the drawings, motor 51 is attached to bracket 58, with bracket 58 being slidably mounted on shaft 59. Stops 61 and 62 are provided on shaft 59 in order to limit the travel of bracket 58. In order to facilitate movement of bracket 58 on shaft 59, a rod 63 is provided, and rod 63 passes through cover 64 and threadedly engages a nut 65 that is attached to bracket 58. Rod 63 is disengaged from bracket 58 before cover 64 is removed. A switch 66 is attached to one side of stop 62 and the bottom of bracket 58 is engageable with a spring lever arm 67 that actuates switch 66.

As shown in FIGURE 7 of the drawings, motor bracket 58 is in contact with stop 61 and, in this position, the concentric portion 57 of cam 52 is engaged with spring follower 53. This concentric portion 57 of cam 52 causes target 41 to be centered. Switch 66 is normally open and, as shown in FIGURE 11 of the drawings, when switch 66 is open, motor 51 is not energized. Therefore, there is no rotation of cam 52 and cam 52 serves merely to center target 41 for a visual check.

Referring now to FIGURE 8 of the drawings, motor bracket 58 is shown in contact with stop 62 and also bracket 58 has engaged lever arm 67 thereby closing switch 66. The eccentric portion 56 of cam 52 is now engaged with spring follower 53 and rotation of cam 52 by motor 51 causes spring follower 53 to reciprocate and, in turn, reflector plate 25 is reciprocated. As target 41 is attached to reflector plate 25, target 41 is also oscillated, or reciprocated, and the magnitude of its movement is determined by the amount of eccentricity on cam 52.

A lens system 68 is attached to base plate 18. The diverging light rays from target 41 are collimated by lens system 68 so that they are parallel and so that target 41 appears to be at infiinity. By way of example, lens system 68 may be comprised of mirrored surfaces 71 and 72 and a front lens 73. Mirrored surfaces 71 and 72 are used to provide a much greater equivalent focal length.

Referring to FIGURES 4 and 11 of the drawings, a pair of batteries 74 and 75 and an "off-on" switch 76 are mounted in cover 64. The batteries and switch 76 are connected to a female connector 77 that mates with a male connector 78 that is mounted on base plate 18, and thus cover 64 is readily removable. By way of example, batteries 74 and 75 may be of the rechargeable, nickel-cadmium type or may be standard "D-size" flashlight batteries. A pair of threaded posts 81 and 82 are attached to base plate 18 and a pair of captive screws 83 and 84 are provided to attach cover 64 to base plate 18.

In operation, the test set 10 of the present invention is attached to the guidance section of a missile 11 by inserting the protuberances 16 on legs 13, 14, and 15 into detents in the skin of the guidance section. The legs on the test set 10 serve as spring levers to keep the protuberances in the detents. With the test set 10 being mounted on the missile 11, rod 63 is pulled outwardly and the concentric portion 57 of cam 52 is engaged with spring follower 53. Switch 76 is then closed by turning knob 79 to an "on" position thereby causing lamp bulb 45 to light the front of target 41. As switch 66 is "open," motor 51 is not energized. With the concentric portion 57 of cam 52 being engaged with spring follower 53, target 41 is centered in lens system 68 and the diverging light rays from target 41 are collimated by lens system 68 so that they are parallel and so that target 41 appears to be at infinity. The guidance section of the missile "views" the target and a presentation is made on the aircraft television display inside the aircraft cockpit.

Rod 63 is next moved inwardly and the eccentric portion 56 of cam 52 engages spring follower 53. Bracket 58 also engages lever arm 67 thereby closing switch 66 whereupon motor 51 is energized. Rotation of the shaft of motor 51 causes cam 52 to rotate and the eccentric portion 56 causes reflector plate 25 to be oscillated. As target 41 is stationarily mounted within reflector plate 25, target 41 is oscillated. As base plate 18 is rotatable relative to mounting plate 12, and as plunger 23 can be selectively positioned in either slot 21 or 22, the test set can be positioned to provide either vertical or horizontal motion of target 41. The motion of target 41 is viewed by the guidance section of missile 11 and the target motion is presented on the aircraft television display to provide a "Go, No-Go" evaluation of the operational readiness of the guidance section and the aircraft television display.

It can thus be seen that the present invention provides a novel device for checking both the guidance section of a missile and the aircraft television display associated therewith.

What is claimed is:

1. A test set for projecting an image of a target into the guidance section of a missile comprising:
    a mounting plate having means for attaching said test set to a missile,
    a base plate rotatably attached to said mounting plate,
    a reflector plate slidably mounted to said base plate and reciprocally movable in a plane parallel to said base plate, said reflector plate having an opaque target attached thereto,
    means for illuminating said opaque target,
    a motor having an output shaft, said motor being slidably attached to said base plate and movable in a plane such that the longitudinal axis of said output shaft is perpendicular to said base plate,
    a cam follower attached to said reflector plate,
    cam means attached to said output shaft of said motor having a concentric portion engageable with said cam follower for centering said opaque target relative to said guidance section of a missile and having an eccentric portion engageable with said cam follower for reciprocating said opaque target relative to said guidance section of a missile, and
    a lens system in optical alignment with said reflector and target for projecting an image of said target into the guidance section of the missile.

2. A test set for projecting an image of a target into the guidance section of a missile as set forth in claim 1 wherein first and second locking means are provided for locking said base plate to said mounting plate whereby said first locking means locks said base plate to said mounting plate in a first position and said opaque target is reciprocal in a first linear direction relative to said guidance section of a missile and whereby said second locking means locks said base plate to said mounting plate in a second position and said opaque target is reciprocal in a second linear direction which is perpendicular to said first linear direction.

References Cited

UNITED STATES PATENTS 1,127,504   2/1915   Patterson.
1,132,269   3/1915   Hough et al.

(Other references on following page)

UNITED STATES PATENTS

| | | |
|---|---|---|
| 1,841,063 | 1/1932 | Semenitz. |
| 2,195,425 | 4/1940 | Roger. |
| 2,320,247 | 5/1943 | Roger. |
| 2,510,374 | 6/1950 | Brady. |
| 2,555,402 | 6/1951 | Field. |
| 2,647,437 | 8/1953 | Bentley et al. |
| 2,848,922 | 8/1958 | Field. |
| 3,087,382 | 4/1963 | De Nygorden. |
| 3,290,986 | 12/1966 | Woehl. |

OTHER REFERENCES

Zukowsky: "Aligning Saturn Missile's Guidance System," Electronics, Feb. 21, 1964, pp. 26–27.

JEWELL H. PEDERSON, Primary Examiner

T. MAJOR, Assistant Examiner